(12) United States Patent
Gartz et al.

(10) Patent No.: US 10,469,640 B2
(45) Date of Patent: Nov. 5, 2019

(54) MOBILE ACCESSORY SYSTEM

(71) Applicant: FELLOWES, INC., Itasca, IL (US)

(72) Inventors: Mark R. Gartz, Mount Prospect, IL (US); Tai Hoon K. Matlin, Round Lake Beach, IL (US); Peter Maletich, Chicago, IL (US)

(73) Assignee: FELLOWES, INC., Itasca, IL (US)

( * ) Notice: Subject to any disclaimer, the term of this patent is extended or adjusted under 35 U.S.C. 154(b) by 0 days.

(21) Appl. No.: 16/132,743

(22) Filed: Sep. 17, 2018

(65) Prior Publication Data

US 2019/0089822 A1 Mar. 21, 2019

Related U.S. Application Data

(60) Provisional application No. 62/559,197, filed on Sep. 15, 2017.

(51) Int. Cl.
*H04M 1/00* (2006.01)
*H04M 1/04* (2006.01)
*F16M 11/10* (2006.01)

(52) U.S. Cl.
CPC ............ *H04M 1/04* (2013.01); *F16M 11/105* (2013.01)

(58) Field of Classification Search
CPC .............................. H04M 1/04; F16M 11/105
USPC ........................ 455/575.1, 90.3, 575.4, 550.1
See application file for complete search history.

(56) References Cited

U.S. PATENT DOCUMENTS

| | | | |
|---|---|---|---|
| 8,264,837 B2 * | 9/2012 | Pakula | G06F 1/1626 361/679.58 |
| 8,265,326 B2 * | 9/2012 | Singh | H04M 1/0258 379/433.02 |
| 8,297,440 B2 | 10/2012 | Schmidt et al. | |
| 8,560,031 B2 | 10/2013 | Barnett et al. | |
| 8,746,448 B1 | 6/2014 | Bellace | |
| 8,844,098 B2 | 9/2014 | Karmatz | |
| 8,887,970 B2 * | 11/2014 | Tsai | G06F 1/1626 224/217 |
| 8,950,638 B2 | 2/2015 | Wangercyn, Jr. et al. | |
| 9,128,668 B2 * | 9/2015 | Johnson | G06F 1/1626 |
| 9,300,346 B2 | 3/2016 | Hirsch | |
| 9,372,507 B2 * | 6/2016 | Dekock | G06F 1/166 |

(Continued)

*Primary Examiner* — Marceau Milord
(74) *Attorney, Agent, or Firm* — Pillsbury Winthrop Shaw Pittman LLP

(57) ABSTRACT

A support system for use with a portable electronic device comprises a base, a resiliently deformable support member, and a resiliently deformable invertible member. The invertible member is connected to the support member and invertible between a retracted position having a convex configuration overlapping the support member provided on the base and having a convex configuration projecting outwardly from the base and an extended position inverted from the convex position wherein the invertible member has a concave configuration projecting outwardly from the support member. Central portions of the support member and the invertible member together define an actuatable portion. The actuatable portion is operable by depression thereof when the invertible member is in the retracted position thereof to inwardly deform the central portions of the invertible member and the support member so as to initiate inversion of the invertible member from the retracted position to the extended position.

21 Claims, 8 Drawing Sheets

(56) References Cited

U.S. PATENT DOCUMENTS

| | | | |
|---|---|---|---|
| 9,392,865 B2* | 7/2016 | Shmulevich | A45F 5/10 |
| 9,481,490 B2* | 11/2016 | Venida | B65D 25/20 |
| 9,705,552 B1* | 7/2017 | Tall | H04B 1/3888 |
| 9,793,941 B1* | 10/2017 | Hirsch | H04B 1/3888 |
| 9,804,636 B2* | 10/2017 | Barnett | G06F 1/1632 |
| 9,866,663 B2* | 1/2018 | Kim | H04M 1/04 |
| 9,894,192 B2* | 2/2018 | Cox, III | H04M 1/185 |
| 9,958,107 B1* | 5/2018 | Hobbs | F16M 13/022 |
| 9,979,428 B2* | 5/2018 | Tomobe | H04B 1/385 |
| 10,001,243 B2* | 6/2018 | Cavalcante | H04B 1/385 |
| 10,019,034 B2* | 7/2018 | Barnett | H01R 13/6315 |
| 10,194,544 B2* | 1/2019 | Wengreen | H05K 5/0204 |
| 2011/0267748 A1 | 11/2011 | Lane et al. | |
| 2013/0140312 A1* | 6/2013 | Lane | A45F 5/00 |
| | | | 220/315 |
| 2015/0257288 A1* | 9/2015 | Livernois | F16M 11/38 |
| | | | 248/346.06 |

* cited by examiner

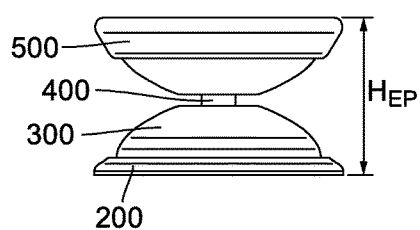 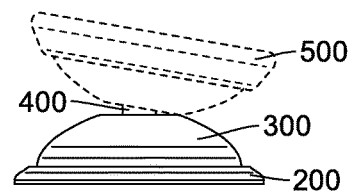
FIG. 6a  FIG. 6b
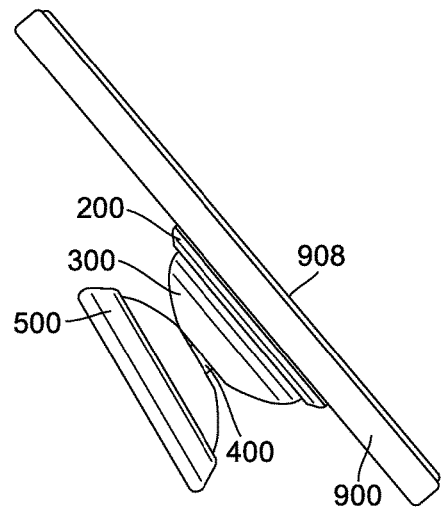
FIG. 7

SECTION 8-8

SECTION 11-11

MOBILE ACCESSORY SYSTEM

CROSS-REFERENCE TO PRIOR APPLICATION

This application claims benefit to U.S. Patent Application Ser. No. 62/559,197 filed Sep. 15, 2017, the contents of which are incorporated herein in their entirety.

BACKGROUND

Field

The present patent application relates to a support system for use with a portable electronic device including supplemental accessories for use with the portable electronic device, more specifically, the present patent disclosure relates to a grip and positioning aid for mobile electronic devices.

Description of Related Art

As mobile communication and computing electronic devices/products get more popular and powerful, they are becoming the primary device of choice. These types of mobile devices/products are also getting larger due to them becoming more of a primary "go to" "all in one" device. Everyday use including the consumption of media has risen consistently and the demand for larger screens has increased the average size of these types of products, thus making them more difficult to hold and operate with one hand. This has led to the popularity of supplemental gripping and holding accessories for these devices/products. Typically, the encasement accessory companies have used additional gripping material to help handle these larger mobile devices, while others have added strapping features that adjust with hook and loop fasteners or utilize elastomeric properties of the material to secure the mobile electronic device to one's hand or to provide a finger grip.

For example, there are many encasements or mobile device protectors that incorporate a strap-like grip aid. The strap-like grip aid is sometimes elastomeric, or hook and loop in nature. It can deform to create a loop like shape around one's hand, fingers or finger so as to secure the mobile device to one's hand. Some examples of these types of strap-based holding devices are disclosed in U.S. Pat. Nos. 8,746,448 and 8,950,638; and U.S. Patent Application Publication No. 2011/0267748.

Other encasement devices may form a "T" shape configuration moving from a flat position to a secondary protruding position in which the secondary position allows one's fingers to slip under and around both sides the top portion of the "T" shape. The transformation from the flat position to the secondary protruding position is facilitated by a dual hinge assembly or a fabric living hinge assembly. Some examples of these types of transforming protruding devices are U.S. Pat. Nos. 8,844,098 and 9,300,346.

Yet another encasement device incorporates a flexible body portion that can be movable from a flat position to a secondary protruding position as a stand for ease of viewing. Additionally, the protrusion of the encasement device can be used as a handle to grip the mobile device more securely. The element that changes from the first position to the secondary protruding position is a strap like device that is guided by a track to move along a longitudinal or lateral direction allowing the strap like mechanism to lay flat in one position and linearly slide as to "buckle" or protrude in the secondary position. This type of device is the subject of U.S. Pat. No. 8,297,440.

These accessories typically are harder to use since they help to secure the mobile electronic device when in use, but tend to protrude or do not "retract" significantly enough as to create an impediment to the storing and carrying of the mobile electronic device. This impediment is a functional hindrance that is often not overcome by the benefit of the supplemental gripping feature.

There are supplemental gripping and positioning aids that endeavor to solve the functional encumbrance of protruding outwards when the mobile device is not activated or in use.

An accessory that is not just an encasement, but is also configured to be directly applied to a portable media player device so as to form a grip aid, utilizes an accordion type contracting and expanding mechanism to facilitate its configurability. This mechanism allows the device to lay relatively flat and can be expanded to create a protrusion that aids in one handed grip of the portable media player to which it is attached to. The accordion device, when expanded, functions as a cord wrap and a kickstand as well. This type of device is the subject of U.S. Pat. No. 8,560,031 and is known in the market as the trademarked PopSocket. For example, see www.popsockets.com.

The product that uses an accordion-like feature ensures the product's grip aid feature protrudes enough to function as a grip aid and kickstand yet retracts significantly enough as to not create a major encumbrance when not in use. The intent of the accordion-like feature is to aid single-handed use of the mobile electronic device on which it has been mounted to. Yet, despite of this intent, the accordion-like feature itself needs both hands to activate. One hand holds the mobile electronic device and the other hand pulls out the accordion-like feature to a protruding position. After the two-handed operation of the accordion-like feature, then one can position their fingers around the protrusion as to operate the mobile device with a single hand.

Another encumbrance created by the accordion-like feature's ability to retract and protrude successfully is the alternating hard and soft ring structure. This alternating structure allows the accordion-like feature to be manipulated and is stiff or structural enough to act as a kickstand supporting the mobile electronic device at an angle when on a relatively flat surface, yet still retract and stay in the retracted position due to these alternating structural rings. This type of solution enhances the functionality of the accessories ability to extend and retract, but creates a protruding architecture that is uncomfortable to grip between one's fingers due to the unyielding nature of the stiff structural rings forcing the fingers to be spread widely apart while abrasively resting on the unyielding stiff structural rings. The protruding and retracting accordion based grip aid product has had more success in the market than the other prior art products previously described, but still has the significant hindrances.

The present patent application endeavors to provide various improvements over prior mentioned examples along with any similar examples that may not have been mentioned or included. The present patent application discloses a system/a device that takes into consideration these important observations noted above and solves them in a manner to be unique and beneficial to those seeking these types of systems/devices in the market.

BRIEF SUMMARY

In one embodiment of the present patent application, a system for use with a portable electronic device is provided. The system comprises a support system for use with the portable electronic device. The support system comprises a base, a resiliently deformable support member, and a resiliently deformable invertible member. The base is configured to be mounted on the portable electronic device or a case thereof. The resiliently deformable support member is provided on the base. The resiliently deformable support member has a convex configuration projecting outwardly from the base. The resiliently deformable invertible member is connected to the support member and is invertible between (a) a retracted position having a convex configuration overlapping the support member and (b) an extended position inverted from the convex position wherein the invertible member has a concave configuration projecting outwardly from the support member. Central portions of the support member and the invertible member together define an actuatable portion. The actuatable portion is operable by depression thereof when the invertible member is in the retracted position thereof to inwardly deform the central portions of the invertible member and the support member so as to initiate inversion of the invertible member from the retracted position to the extended position.

In another embodiment of the present patent application, a mount system is provided. The mount system comprises a stationary attachment device and a support system for use with a portable electronic device. The support system comprises a base, a resiliently deformable support member, and a resiliently deformable invertible member. The base is configured to be mounted on the portable electronic device or the case thereof. The resiliently deformable support member is provided on the base. The resiliently deformable support member has a convex configuration projecting outwardly from the base. The resiliently deformable invertible member is connected to the resiliently deformable support member. The resiliently deformable invertible member is invertible between (a) a retracted position having a convex configuration overlapping the resiliently deformable support member, and (b) an extended position inverted from the convex, retracted position wherein the resiliently deformable invertible member has a convex configuration overlapping the stationary attachment device. Central portions of the support member and the invertible member together define an actuatable portion. The actuatable portion is operable by depression thereof by the stationary attachment device when the invertible member is in the retracted position thereof to inwardly deform the central portions of the invertible member and the support member so as to initiate inversion of the invertible member from the retracted position to the extended position in which the invertible member has an overlapping and interengaging relationship with the stationary attachment device to mount the support system to the stationary attachment device.

In yet another embodiment of the present patent application, a method for mounting a support system for use with a portable electronic device to a stationary attachment device is provided. The support system comprises a base, a resiliently deformable support member, and a resiliently deformable invertible member. The base is configured to be mounted on the portable electronic device or a case thereof. The resiliently deformable support member is provided on the base. The support member has a convex configuration projecting outwardly from the base. The resiliently deformable invertible member is connected to the support member. Central portions of the support member and the invertible member together to define an actuatable portion thereof. The method comprises mounting the support system on the portable electronic device or the case thereof, when the invertible member is in a retracted position having a convex configuration overlapping the support member; and actuating the actuatable portion by depression thereof by the stationary attachment device when the invertible member is in the retracted position thereof to inwardly deform the central portions of the invertible member and the support member so as to initiate inversion of the invertible member from the retracted position to an extended position in which the invertible member has a convex configuration overlapping the stationary attachment device.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIGS. 6a and 6b show side views of the support system in the extended position in accordance with an embodiment of the present patent application, wherein, in FIG. 6a, an actuatable connector of the support system is in an extended position, and wherein, in FIG. 6b, the actuatable connector extends and flexes in a kickstand position allowing a resiliently deformable invertible member of the support system to pivot at proximal ends of the assembled support system;

FIG. 7 shows a side view of the support system in the extended position, mounted on the portable electronic device, wherein the support system is shown in a kickstand configuration, in accordance with an embodiment of the present patent application;

DETAILED DESCRIPTION OF THE DRAWINGS

Figure 1:
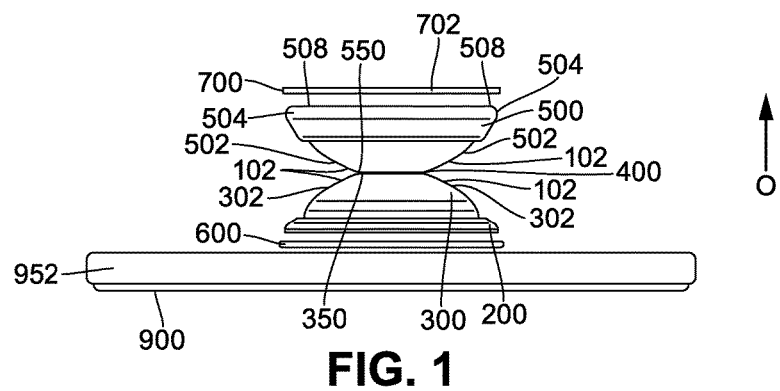
FIG. 1 shows a side view of a support system for use with a portable electronic device, wherein the support system is in an extended position, in accordance with an embodiment of the present patent application.
Figure 3A:
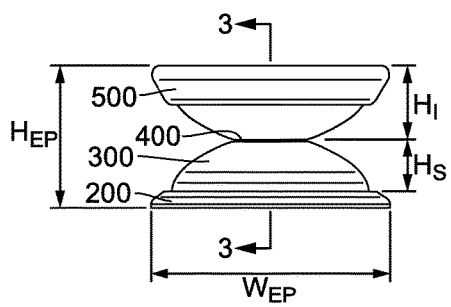
FIG. 3a shows a side view of the support system in the extended position in accordance with an embodiment of the present patent application.
Figure 3B:
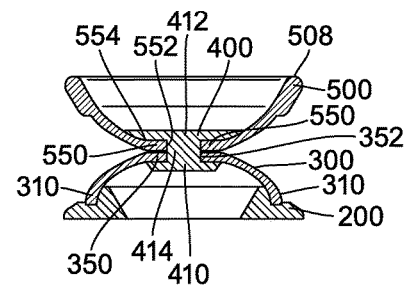
FIG. 3b shows a cross-sectional side view (taken along an axis 3-3 of FIG. 3a) of the support system in the extended position in accordance with an embodiment of the present patent application.
Figure 4A:
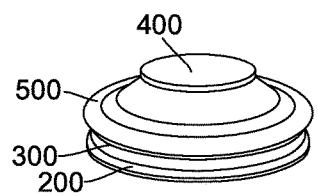
FIGS. 4a-4c show perspective views of the support system in the retracted position, in an intermediate position, and the extended position, respectively, in accordance with an embodiment of the present patent application.
Figure 4B:
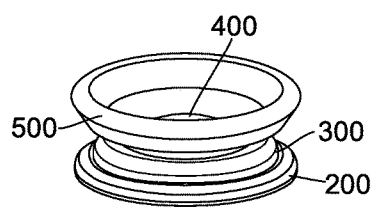
Figure 4C:
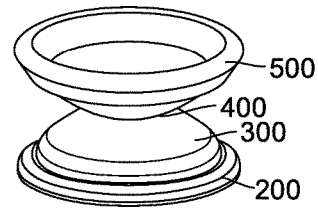
Figure 5A:
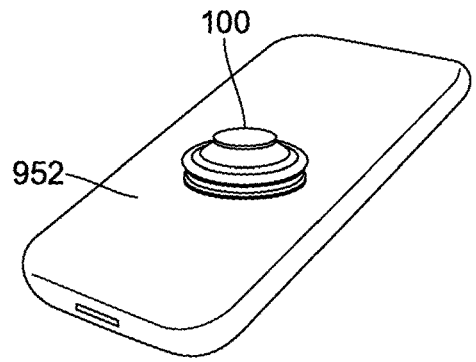
FIGS. 5a-5c show perspective views of the support system mounted on a portable electronic device in the retracted position, in the intermediate position, and the extended position, respectively, in accordance with an embodiment of the present patent application, where a user's hand/fingers placement is illustrated in FIG. 5c to show how the support system aids the user of the portable electronic device in gripping of the portable electronic device.
Figure 5B:
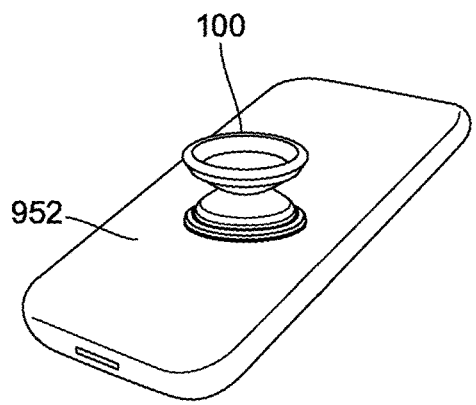
Figure 5C:
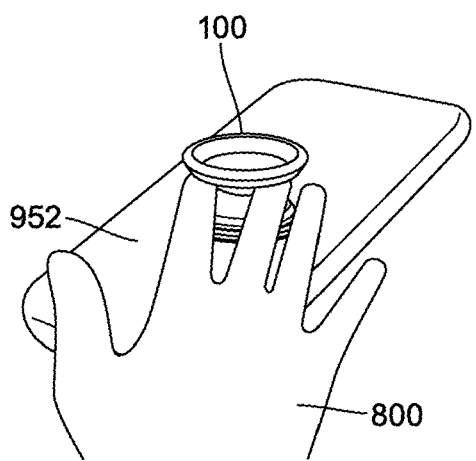

FIGS. 1-5c show a support system 100 for use with a portable electronic device 900 (as shown in FIG. 5a-5c). The support system 100 comprises a base 200, a resiliently deformable support member 300, and a resiliently deformable invertible member 500. The base 200 is configured to be mounted on the portable electronic device 900 or a case 952 thereof. The support member 300 is provided on the base 200. The support member 300 has a convex configuration projecting outwardly (in the direction of an arrow O as shown in FIG. 1) from the base 200. The invertible member 500 is connected to the support member 300 and is invertible between (a) a retracted position RP (as shown in FIGS. 2a, 2b, 4a and 5a) having a convex configuration overlapping the support member 300 and (b) an extended position EP (as shown in FIGS. 1, 3a, 3b, 4c and 5c) inverted from the convex position wherein the invertible member 500 has a concave configuration projecting outwardly (in the direction of the arrow O as shown in FIG. 1) from the support member 300.

Central portions 350 and 550 of the support member 300 and the invertible member 500 together define an actuatable portion. The actuatable portion is operable by depression thereof when the invertible member 500 is in the retracted position thereof to inwardly deform the central portions 350 and 550 of the invertible member 500 and the support member 300 so as to initiate inversion of the invertible member 500 from the retracted position to the extended position. The system 100 further comprises an actuatable connector 400 connecting the central portions 350 and 550 of the support member 300 and the invertible member 500 together to define the actuatable portion for operation by depression of the actuatable connector 400.

The actuatable connector 400 connects central portions 350 and 550 of the support member 300 and the invertible member 500 together. The actuatable connector 400 is operable by depression thereof when the invertible member 500 is in the retracted position RP thereof to inwardly deform the central portions 550 and 350 of the invertible member 500 and the support member 300, respectively so as to initiate inversion of the invertible member 500 from the retracted position RP to the extended position EP.

The support system 100 includes a closed convex dome like position/configuration (e.g., as shown in FIGS. 2a, 2b, 4a, 5a, 9a, 10a, 10c, 12a, 12c, 13, 14 and 15) that allows the mobile electronic device 900 to be easily inserted, carried and transported in one's pocket, purse or jacket and withdrawn easily due to its smooth and minimally protruding position in the non-actuated closed convex state. Also, the support system 100 for use with the mobile device 900 can be actuated by the one hand of a user/an operator 800 (as shown in FIG. 5c) holding the mobile device 900.

The support system 100 also allows for a dual function in that the user 800 of the portable electronic device 900 may use the support system 100 to assist in allowing the user 800 to angularly position the portable electronic device 900 with respect to a substantially flat (e.g., a horizontal or a vertical) mount surface and to carry/hold/grasp the portable electronic device 900 using the same support system 100.

The support system 100 may be referred to as a (resiliently invertible/inverting) grip aid or gripping aid for the portable electronic device 900. The support system 100 provides a gripping area 102 that allows the user 800 to insert his/her two fingers comfortably around the support system 100, when the invertible member 500 is in the (inverted and) extended position EP, so as to hold/grip the portable electronic device 900 using the support system 100. That is, the gripping area 102 is an area in which the user 800 of the portable electronic device 900 positions their two fingers comfortably and securely around the support system 100. The gripping area 102 includes surfaces 302 and 502 of the support member 300 and the invertible member 500, respectively. The surface 302 of the support member 300 is an outer surface of the support member 300 that is facing outwardly and away from the base 200. The surface 502 of the invertible member 500 is an outer surface of the invertible member 500 that is facing (towards) the base 200 and the support member 300 (i.e., when the invertible member 500 is in the extended position EP and the retracted position RP). The support system 100 provides added grip to the portable electronic device 900 by allowing the user 800 to grasp the surfaces 302 and 502 of the support system 100 in addition to side walls of the portable electronic device 900 or the case 952 thereof.

The support system 100 may also be referred to as a (resiliently invertible/inverting) positioning aid for the portable electronic device 900. The support system 100 may be referred to as a (resiliently invertible/inverting) kickstand for the portable electronic device 900. The support system 100 is configured for positioning/displaying a screen 908 (as shown in FIG. 7) of the portable electronic device 900 in a horizontal viewing position, a partially horizontal viewing position or an inclined (with respect to a substantially flat horizontal mount surface) viewing position. The support system 100 is also configured for positioning/displaying the screen 908 of the portable electronic device 900 in a vertical viewing position, a partially vertical viewing position or an inclined (with respect to a substantially flat vertical mount surface) viewing position.

The support system 100 may be readily reconfigurable to be used in more than one type of configuration (or application). For example, the support system 100 may be easily removed from the surface of the portable electronic device 900 or of the protective encasement/case 952 that mounts to the portable electronic device 900 and repositioned elsewhere on the surface of the portable electronic device 900 or of the protective encasement/case 952 that mounts to the portable electronic device 900. In one embodiment, one or more support systems 100 may be mounted on the same portable electronic device 900. The support system 100 may also be easily removed from the mount surface and repositioned elsewhere on the same mount surface or a different mount surface. As clear from the discussions with respect to FIGS. 6a, 6b and 7 below, the support system 100 is also configured to provide different viewing positions for (the screen of) the portable electronic device 900.

Figure 2A:
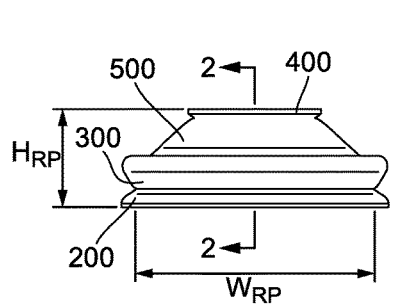
FIG. 2a shows a side view of the support system in a retracted position in accordance with an embodiment of the present patent application.

Referring to FIGS. 2a and 3a, the support system 100 has a width dimension $W_{EP}$, when the invertible member 500 is in the extended position EP, that may generally range from about 30 millimeters to about 50 millimeters. The support system 100 has a width dimension $W_{RP}$, when the invertible member 500 is in the retracted position RP, that may generally range from about 30 millimeters to about 50 millimeters. The support system 100, when the invertible member 500 is in the retracted position RP, has a height dimension $H_{RP}$ that may generally range from about 10 millimeters to about 20 millimeters. The support system 100, when the invertible member 500 is in the extended position EP, has a height dimension $H_{EP}$ that may generally range from about 20 millimeters to about 35 millimeters. The support system 100, when the invertible member 500 and the actuatable connector 400 are in the extended position EP, as shown in FIG. 6a, has a height dimension $H'_{EP}$ that may generally range from about 20 millimeters to about 35 millimeters. The invertible member 500, in the extended position EP, has a height dimension $H_1$ that may generally range from about 8 millimeters to about 15 millimeters. The support member 300, has a height dimension $H_S$ that may generally range from about 10 millimeters to about 18 millimeters.

The portable electronic device 900 is a handheld device that is compact and portable enough to be held/carried and used in one or both hands of the user 800 of the portable electronic device 900. The portable electronic device 900 may be any computing device designed for hand-held usage. The portable electronic device 900 may include cellular communication capabilities. For example, the portable electronic device 900 may include a mobile electronic device, a cellular phone, a Personal Digital Assistant (PDA), a music player, a MP3 player, a pager, a bar code scanner, an e-reader, a digital camera, a tablet, a gaming device, etc.

The portable electronic device 900 is powered by an internal (rechargeable) battery. The portable electronic device 900 includes the screen 908 for displaying or viewing. For example, the user 800 may use the screen 908 of the portable electronic device 900 to watch a video or the user 800 may interact with the screen 908 of the portable electronic device 900 (e.g., using a touchpad, viewing incoming calls, playing a game, messaging, viewing clock or other features). The portable electronic device 900 may have music playing and/or video processing and displaying capabilities integrated into such devices in addition to texting (e.g., SMS, MMS, etc.) capabilities.

The base 200 of the support system 100 is configured to be mounted on the portable electronic device 900. The term "mounted on" as used herein includes mounting the base 200 of the support system 100 directly on a surface of the portable electronic device 900 or mounting the base 200 of the support system 100 indirectly to the device 900 on a surface of the protective encasement/case 952 of the portable electronic device 900. In one embodiment, the base 200 of the support system 100 may also be part of the protective encasement/case 952 that mounts to the portable electronic device 900. That is, the base 200 of the support member 100 may be integrally formed with the protective encasement/case 952 that mounts to the portable electronic device 900 such that the support member 100 and the protective encasement/case 952 form a single, integral unit. The function of the base 200 may be incorporated into the protective encasement/case 952 for the portable electronic device 900, or may be part of the standalone accessory assembly.

Figure 2B:
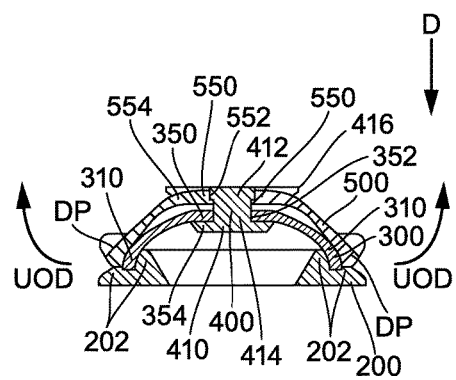
FIG. 2b shows a cross-sectional side view (taken along an axis 2-2 of FIG. 2a) of the support system in the retracted position in accordance with an embodiment of the present patent application.

As shown in FIGS. 2a and 2b, the base 200 is configured to be permanently attached to the support member 300. The base 200, in FIG. 2a, has a protrusion portion 202 in which the support member 300 can be attached. The upwardly facing protrusion portion 202 functions to help initiate the inverting action of the invertible element 500 when the operator 800 presses downward on the actuatable connector 400 which in turn forces the distal perimeter DP of the invertible element 500 to move in an upwards and outwards direction in the direction of an arrow UOD.

The base 200 may be made from ABS (acrylonitrile butadiene styrene), polycarbonate, thermoplastic polyurethane (TPU), or other similar materials as would be appreciated by one skilled in the art.

The base 200 of the support system 100 may be directly mounted by an attachment member 600 to the portable electronic device 900 or to the protective encasement/case 952 that mounts to the portable electronic device 900 even if the portable electronic device 900 or the case 952's surface has a slight rise or curve. The attachment member 600 represents an attaching/attachment element or how the support system 100 is hereby attached to the portable electronic device 900 directly, to the interim protective encasement/case 952, or integrated by permanent attachment to the protective encasement/case 952 for the portable electronic device 900. The attachment member 600 may include an adhesive tape layer. The attachment member 600 may include, but not limited to, a semi-permanent adhesive, a semi-removable adhesive gel pad, a suction cup, a mechanical engagement like a quarter turn bayonet type attachment, or any of the types of attachments or attachment mechanisms that are covered herein and/or well known to one skilled in the art.

As shown in FIG. 5a, the support system 100 in its closed position forms a dome like structure on the back of the portable electronic device 900 or the device 900's protective encasement/case 952 that it has been mounted to. Alternatively, the base 200 of the support system 100 may be built into the protective encasement/case 952 that is designed to fit a particular type of portable electronic device 900 so as to mount the support system 100 to a device (e.g., mobile electronic device 900 or its protective encasement/case 952) without the need of the adhesive tape layer or the attachment member 600.

The base 200 of the support system 100 not only functions as an attachment mechanism/member, it has certain elements and details that aid in the transformation of the resiliently deformable invertible member 500 of the support system 100. In one embodiment, the base 200 is stiffer than both the support member 300 and the invertible member 500. This is due to the base 200's function as an attachment mechanism/member and as a supportive geometric member that helps with the inversion process of the invertible member 500. This occurs when the invertible element 500's distal end portions or perimeter is pressed against the purposefully designed element of the base 200 when actuating the inversion process of the invertible member 500.

Along with these functions, the base 200 may also be configured to house technologies and features that enhance the portable electronic device 900's functionality or the functionality of the accessory/support system 100 itself. For example, the base 200 may include blue tooth enhanced functions, call light, LED flashlight, picture flash, photo mirror, battery, speaker, an auxiliary power source, and/or memory elements. The base 200 may also include credit card and cash holding/clip functions as well. This is not a complete list of possible functional elements that can be readily added to the base 200/the support system 100, they are just a few examples to demonstrate additional functions that could be readily incorporated into this support system 100.

The resiliently deformable support member 300 may also be referred to as a lower (dome) member/element, lower supportive member/element, or resiliently supportive member of the support system 100.

The support member 300 is provided on the base 200. As shown in FIGS. 2a and 2b, the support member 300 is configured to be permanently attached to the base 200. That is, the support member 300 is permanently attached to the base 200, which is molded or formed of a stiffer, rigid material than the support member 300. The support member 300 and the base 200 may be formed (e.g., molded) separately and permanently attached together by any attachment mechanism as would be appreciated by one skilled in the art. As shown in FIGS. 2b and 3b, the base 200 is formed with the protruding portion 202 configured for receiving portions 310 of the support member 300 therein. The support member 300 and the base 200 may also be molded successively and/or simultaneously.

The support member 300 is made from the same or a similar material as the invertible member 500. The support member 300 is made from a different material than the base 200. The support member 300 is formed or molded using a thermal elastomer, urethane, silicon or a similarly resilient material as would be appreciated by one skilled in the art.

The terms "resiliently deformable" as used herein includes an ability of the member to change back its shape/configuration to its previous shape/configuration when the pressure or other force applied to the member is ended/stopped/changed. The resiliently deformable nature of the member may be attributed to the properties of the material of the member. The resiliently deformable member may repeat the process (of moving between its shapes/configurations) many times without the material of the member losing its elastic properties.

The support member 300 has a convex configuration projecting outwardly (in the direction of an arrow O as shown in FIG. 1) from the base 200. That is, the support member 300 has a convex shaped configuration with respect to the base 200 with the apex or central portions 350 of the convex shaped support member 300 positioned away (in the direction of an arrow O as shown in FIG. 1) from the base 200.

The central portion 350 of the support member 300 has an opening 352 (as shown in FIGS. 2b and 3b) therein that is configured to receive a portion of a central portion 414 of the actuatable connector 400. An inner surface 354 of the central portion 350 of the support member 300 is configured to engage with surfaces of the lower portion 410 of the actuatable connector 400 both when the invertible member 500 is in the extended position EP and in the retracted position RP.

The actuatable connector 400 may also be referred to as an assembly grommet. Referring to FIGS. 2b and 3b, the actuatable connector 400 is configured to connect the central portion 550 of the invertible element 500 and the central portion 350 of the support member 300 together.

The actuatable connector 400 may have, but not limited to in any way, a mushroom head insert design. The actuatable connector 400 may include the lower portion 410, an upper portion 412 and a central portion 414 therebetween. The central portion 414 connects the lower portion 410 and the upper portion 412. The central portion 414 also passes through opening 352 of the central portion 350 of the support member 300 and an opening 552 of the central portion 550 of the invertible member 500 to connect the central portion 350 of the support member 300 and the central portion 550 of the invertible member 500. In the illustrated embodiment of FIGS. 2a, 2b, 3a, 3b, the circumference of the lower portion 410 is less than the circumference of the upper portion 412. Also, the circumference of the central portion 414 is smaller than both the circumferences of the lower portion 410 and the upper portion 412. It is contemplated that the actuatable connector 400 may have other sizes, shapes or configurations as would be appreciated by one skilled in the art as long as the actuatable connector 400 connects the invertible member 500 and the support member 300 and operable by depression (e.g., in the direction of the arrow D as shown in FIG. 2b) thereof when the invertible member 500 is in the retracted position RP thereof to inwardly deform the central portions 550 and 350 of the invertible member 500 and the support member 300, respectively so as to initiate inversion of the invertible member 500 from the retracted position RP to the extended position EP.

An upwards facing surface 416 (as shown in FIGS. 2a and 2b) of the actuatable connector 400 may be decorated with a design/graphical element, by way of, in mold decorating, pad printing, silk screening, printing or by way of an adhesive sticker. For example, the upwards facing surface 416 of the actuatable connector 400 may include a decorative pattern or a design formed thereon. For example, the decorative pattern or design may include a sports team logo, a sports team mascots, a sports team name, a school or university indicia (letters or name), other designs, a favorite character, symbols, monograms, insignia, affiliations, names, user created graphics, messages, personalized images/pictures, user customized designs/images, or any combination thereof.

The actuatable connector 400 is formed or molded from the same or similar material as the base 200. The actuatable connector 400 is formed or molded from a different material than the base 200. The actuatable connector 400 may be constructed, molded, or formed of a harder material than the members (i.e., the invertible element 500 and the support member 300) to which it connects. The actuatable connector 400 may be made from ABS (acrylonitrile butadiene styrene), polycarbonate, thermoplastic polyurethane (TPU), or other similar materials as would be appreciated by one skilled in the art.

The actuatable connector 400 is configured to be operable by depression (e.g., in the direction of an arrow D as shown in FIG. 2b) thereof when the invertible member 500 is in the retracted position RP thereof to inwardly deform the central portions 550 and 350 of the invertible member 500 and the support member 300, respectively so as to initiate inversion of the invertible member 500 from the retracted position RP to the extended position EP. The operation of the support system 100 is described in detail below. As the center of the invertible member 500 is pressed inward against the support member 300, the tension generated in the invertible member 500 facilitates the inversion action of its outer peripheral portion.

FIGS. 6a and 6b show exemplary drawings of the present patent application illustrating how the actuatable connector 400 can optionally allow the invertible member 500 to separate from the support member 300 when needed so as to expand the finger engagement area for comfort for larger user hands and to advantageously create a more supportive angular position and shape when the support system 10 is used in the kickstand configuration. FIG. 7 shows an exemplary drawing of the present patent application when the support system 100 is used in the kickstand configuration.

The actuatable connector 400 is configured to be in an extended position as shown in FIG. 6a. The actuatable connector 400 is also configured to extend and flex in a kickstand position allowing the invertible member 500 to pivot at proximal ends of the assembled support system 100 as shown in FIG. 6b. For example, referring to FIGS. 6a, 6b and 7, when the actuatable connector 400 is in the extended position and the invertible member 500 is in the extended position, one of the invertible member 500 and the support member 300 is configured to be pivotable about the actuatable connector 400 and with respect to the other of the invertible member 500 and the support member 300.

The resiliently deformable invertible element 500 is shown in the closed or dome like shape in FIGS. 2a and 2b. The invertible element 500 has a thicker band of material on its distal perimeter DP so as to keep it geometrically stable. The invertible element 500 may also be referred to as upper resiliently inverting element, or an upper member/element.

The invertible member 500 is made from the same or a similar material as the support member 300. The invertible member 500 is made from a different material than the support member 300. The invertible member 500 is made from a different material than the base 200 and the actuatable connector 400. The invertible member 500 is formed or molded using a thermal elastomer, urethane, silicon or a similarly resilient material as would be appreciated by one skilled in the art. The invertible member 500 is formed or molded as a single, one-piece member.

The invertible element 500 is connected to the support member 300 by way of actuatable connector 400. The invertible element 500 is, shown FIGS. 3a and 3b, in the open or cup like shape and connected proximally to the support member 300 by way of the actuatable connector 400.

The central portion 550 of the invertible member 500 has the opening 552 therein that is configured to receive a portion of the central portion 414 of the actuatable connector 400. A surface 554 of the central portion 550 of the invertible member 500 is configured to engage with surfaces of the upper portion 412 of the actuatable connector 400 both when the invertible member 500 is in the extended position EP and in the retracted position RP.

As shown in the illustrated embodiment of FIGS. 2a, 2b, 3a, and 3b, the support system 100 may include a single invertible member 500. In another embodiment, the support system 100 may include several additional resiliently deformable invertible elements. One or more of these elements being resilient in nature and/or invertible as with the elements attaching to each other in an alternating manner proximally (i.e., at the center) and distally towards to perimeter). These resiliently deformable invertible elements 500 do not have to be fully revolved on the distal perimeter so as to form a complete dome like or cup like. That is, the invertible elements 500 only need to be resiliently invertible so as to transform from a convex shape to a concave shape. This is accomplished by outer most perimeter points or distal ends to stay relatively constant in distance to each other forcing the proximal, internal portions of the curve to invert themselves when stressed. Since the distal ends are stable in distance to each other, a flexible material/skin can be applied to the upper most resiliently deformable invertible element 500's perimeter edge as to seemingly "cover" the cup. This material/skin is flexible and is stretchable so as to not impede the transformative nature of the resiliently deformable invertible element on which it is attached. Optionally, this flexible member and any other element/component of the support system 100 may be decorated or branded appropriately.

The invertible member 500 is invertible between (a) the retracted position RP (as shown in FIGS. 2a, 2b, 4a and 5a) having a convex configuration overlapping the support member 300 and (b) the extended position EP (as shown in FIGS. 1, 3a, 3b, 4c and 5c) inverted from the convex position wherein the invertible member 500 has a concave configuration projecting outwardly (in the direction of the arrow O as shown in FIG. 1) from the support member 300.

The retracted position RP of the invertible member 500 may also be referred to as a closed position, a dome position, or an overlapping position and is shown, for example, in FIGS. 2a, 2b, 4a, 5a, 9a, 10a, 10c, 12a, 12c, 13, 14 and 15. When in the retracted position RP, the distal portions of the support member 300 and the invertible member 500 are overlapping and engaging each other. When in the retracted position RP, the central portion 350 of the support member 300 and the central portion 550 of the invertible member 500 are overlapping and slightly spaced apart (e.g., to have a small gap therebetween).

The invertible member 500 may have one or more intermediate positions between the extended position and the retracted position. For example, FIGS. 4b and 5b show the support system 100 in one of the intermediate positions. The one or more intermediate positions may also be referred to as actuated inverted position, but not yet in the fully extended position.

The extended position EP of the invertible member 500 may also be referred to as an inverted cup position, a fully extended position, or a transformed position and is shown, for example, in FIGS. 1, 3a, 3b, 4c, 5c, 6a, 6b, 7, 8a, 8b, 9b, 10b, 11a, 11b and 12b.

When the operator/user 800 is ready to activate the inverting feature of the support system 100, he/she simply presses the actuatable connector 400 (e.g., at or near the upper protruding dome apex) downward (in the direction of the arrow D as shown in FIG. 2b). By depressing or pressing the actuatable connector 400 downwardly in the direction of the arrow D, when the invertible member 500 in the retracted position RP, the central portion 550 of the invertible member 500 and the central portion 350 of the support member 300 are deformed inwardly in the direction of the arrow D until the invertible member 500 reaches its self-inversion threshold. The self-inversion threshold may also be referred to as a deformation threshold. If the invertible member 500 is in the retracted position RP and is deformed past that self-inversion threshold, the invertible member 500 inverts itself to the extended position EP. This inversion occurs quickly and automatically as the inversion releases the energy stored in the invertible member 500. The energy is stored when the invertible member 500 is moved from the extended position EP to the retracted position RP. This stored energy is released when inverting the invertible member 500 from the retracted position RP to the extended position EP.

Once the invertible member 500 reaches the self-inversion threshold, the invertible member 500 inverts instantly into a concave cup like shape (as shown in FIGS. 1, 3a, 3b, 4c, 5c, 6a, 6b, 7, 8a, 8b, 9b, 10b, 11a, 11b and 12b). FIGS. 3a and 3b show views of the support system 100 in the transformed cup like position (after the operator 800 has pressed downward on connecting member 400's upper surface).

FIGS. 4a-4c show views of the support system 100 in the various stages of transformation. FIGS. 5a-5c also show views of the support system 100 in the various stages of transformation and how an operator would engage with the support system 100 to improve and secure their grip of the mobile electronic device 900 (or its case 952) on which it has been mounted to. FIG. 4a shows the support system 100 in the closed cup like position, while FIG. 5a shows the support system 100 in the closed cup like position as attached to the portable electronic device 900.

FIG. 4b shows the support system 100 just as the invertible member 500 has initiated the inversion process/procedure. The invertible member 500's distal perimeter inverted in its attempt to keep a geometrically constant in dimension after a force has been exerted downward on the actuatable connector 400's upwards facing surface. This downward action initiates the inversion of the invertible element 500.

FIGS. 4c and 5b shows the support system 100 fully transformed and protruding upwards from the surface of the portable electronic device 900 which it has been mounted to, exposing the natural finger placement detail between the support member 300 and the invertible member 500. Since the support member 300 and the invertible member 500 are constructed or molded from softer materials, their shapes slightly give to create the gripping area 102 in which the operator 800 can then interlace their (two) fingers around comfortably and securely (e.g., as shown in FIG. 5c).

Once inverted, the now concave shaped invertible member 500 is protruding significantly enough from the supportive element 300 so as to allow the operator 800 to insert their fingers comfortably around the inverted and extended soft cup like invertible member 500.

Optionally, the upper, now protruding cup like invertible member 500 can rise and separate from the support member 300 by way of the extending grommet/actuatable connector 400 so as to create an optimal comfort zone for finger placement. Both the support member 300 and the invertible member 500 are optionally constructed or molded out of a resilient material that yields to a point as to reduce the strain or abrasive action against the engaged interlaced fingers of the user 800.

With the invertible member 500 in the actuated and protruding position, the mobile electronic device 900 which the support system 100 has been mounted to can be set on its edge while engaging the invertible member 500 as a kickstand. The flexible resilient nature of the invertible member 500 allows the edge(s) of the invertible member 500 to flatten, grip and stabilize the mobile electronic device 900 in this configuration so the screen 908 of the portable electronic device 900 can be viewed at an optimal recommended viewing angle more readily and ergonomically.

Referring to FIG. 7, the portable electronic device 900 may be oriented with respect to the substantially flat (vertical or horizontal) mount surface using the support system 100 for viewing the screen 908 of the portable electronic device 900. For example, to position the screen 908 of the portable electronic device 900 in a viewable configuration, the support system 100 is positioned such that at least a portion of the invertible member 500 is in contact with the mount surface. For example, outer edges of the invertible member 500 (in its concave, extended configuration) may be positioned such that they face and contact the mount surface.

To return the inverted and protruding cup like invertible member 500 to its original dome like shape, the operator 800 simply pushes edges 504 of the invertible member 500 downward, as the protruding lower element 300 starts to invert the lower contacting portion/central portion 550 of the invertible member 500 until the invertible member 500 reaches its self-inversion threshold. This then returns the invertible member 500 back to its original dome like shape in a rapid single movement. That is, if the invertible member 500 is in its extended position EP and is deformed past that self-inversion threshold, the invertible member 500 instantly inverts back to its retracted position RP. This inversion occurs quickly and automatically as the inversion releases the energy stored in the invertible member 500. The energy is stored when the invertible member 500 is moved from the retracted position RP to the extended position EP. This stored energy is released by inverting the invertible member 500 from the extended position EP to the retracted position RP.

In FIGS. 1-13 and 15, the support member 300 and the invertible member 500 have spherical or circular shaped configurations. It is contemplated, in the present patent application, that the support member 300 and the invertible member 500 may have other sizes, shapes or configurations as would be appreciated by one skilled in the art. For example, the support member 300 and the invertible member 500 may have other geometric shaped configurations that would still allow the components of the support system 100 to function as described in the embodiments of the present patent application. For example, the support member 300 and the invertible member 500 may have either triangular shaped configuration (e.g., see left figure in FIG. 14) or rectangular shaped configuration (e.g., see the right figures in FIG. 14). The support member 300 and the invertible member 500 may have many other differing alterative geometric shaped configurations as would be appreciated by one skill in the art.

Figure 15:
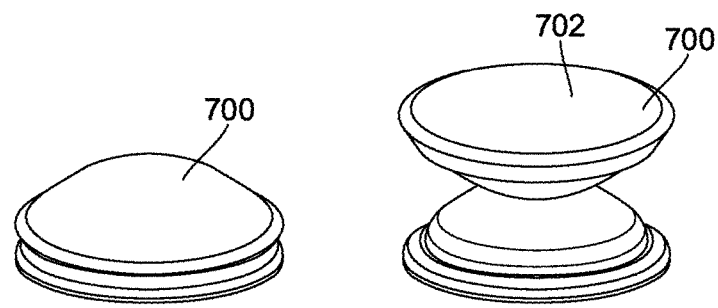
FIG. 15 shows perspective views of the support system in its retracted and its extended position, respectively, where the support system includes a decorative element/member, in accordance with an embodiment of the present patent application.

Referring to FIGS. 1 and 15, the support system 100 may include a decorative element 700. The decorative element 700 may be a pliable stretch graphical material that behaves in a similar manner to spandex. The decorative element 700 may be attached to the distal end 508 of the invertible member 500 by way of a permanent attachment method such as co-molding, insert-molding, adhesive or a semi-permanent method by way of an additional flexible press fit collet, snap fit part or retained by an insert ring in which the decorative element 700 has been permanently attached. FIG. 15 shows an isometric view of the support system 100 with the decorative component 700 and how the decorative element 700 interacts with support system 100.

The decorative element 700 may cover a cavity formed in the invertible member 500 when the invertible member 500 is in its extended position. An upper surface of the decorative element 700 may include a decorative pattern or a design formed thereon. For example, the decorative pattern or design may include a sports team logo, a sports team mascots, a sports team name, a school or university indicia (letters or name), other designs, a favorite character, symbols, monograms, insignia, affiliations, names, user created graphics, messages, personalized images/pictures, user customized designs/images, or any combination thereof.

Figure 8A:
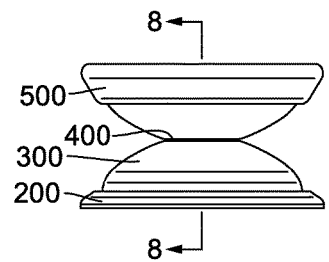
FIG. 8a shows a side view of the support system in the extended position, where the support system comprises a speaker in accordance with an embodiment of the present patent application.
Figure 8B:
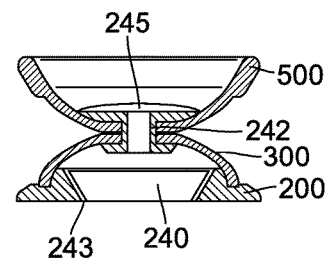
FIG. 8b shows a cross-sectional side view (taken along an axis 8-8 of FIG. 8a) of the support system in the extended position, where the support system comprises the speaker, in accordance with an embodiment of the present patent application.

FIGS. 8a and 8b show the support system 100 in the transformed extended position. The invertible member 500 of the support system 100 is shown in the extended position EP or cup like shape.

The invertible member 500 is interconnected to the support member 300 by way of a speaker grill 245 and a sound tube 242 that are functionally designed to interconnect utilizing a snap fit or other similar arrangement as to retain the invertible member 500 and the support member 300 securely while letting sound to pass freely between the interconnected components 500 and 300 and out from the speaker grill 245. That is, the actuatable connector 400 that connects the invertible member 500 and the support member 300 includes the speaker grill 245 and the sound tube 242.

The base 200, in FIG. 8b, has a recessed cavity 243 that is configured to receive the sound speaker 240 therein. The sound speaker 240 can be affixed to or assembled within the recessed cavity 243 of the base 200. The sound speaker 240 is configured to produce sound waves. The speaker grill 245 and the sound tube 242 are configured to transmit the sound waves produced by the speaker 240.

Figure 9A:
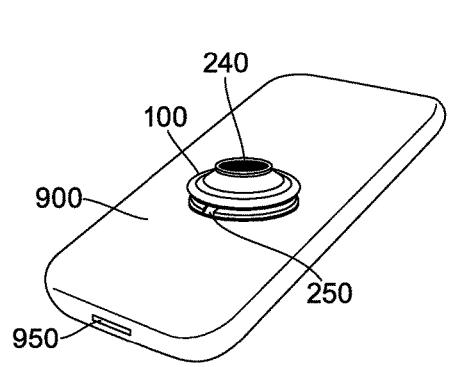
FIGS. 9a-9b show perspective views of the support system mounted on the portable electronic device in the retracted position and the extended position, respectively, where the support system includes the speaker, in accordance with an embodiment of the present patent application.
Figure 9B:
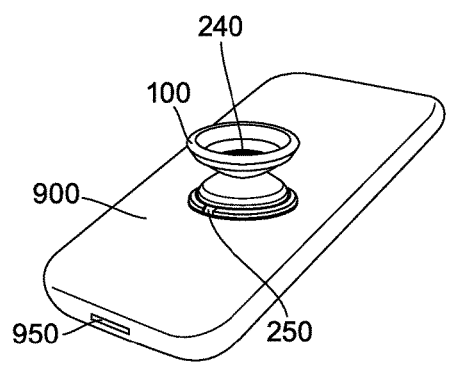

FIGS. 9a and 9b show views of the support member 100 in the closed and open stages of transformation including the optional amplified speaker 240. FIG. 9a shows the support system 100 in the closed cup like position with the amplified speaker 240's protective grill 245 exposed. FIG. 9b shows the support system 100 in fully transformed and protruding upwards from the surface of which it has been mounted to (i.e., the portable electronic device 900), exposing the natural finger placement detail between the invertible member 500 and the support member 300 and with the upper element cupping the speaker 240's sound outlet (e.g., the protective grill 245). This design allows for natural acoustical amplification and a more dynamic base sound. The speaker 240 can be accessed by the transmitting device by wired, through a connector 250, or by wireless means. The transmitting device can be any device in which it has been attached to, such as the portable electronic phone 900, or indirectly (smart phone with case), or optionally any other transmitting or directly wired device within range.

Figure 10A:
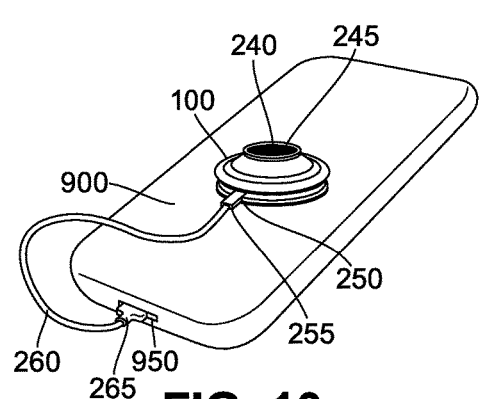
FIGS. 10a-10c show perspective views of the support system mounted on the portable electronic device, where the support system is in the retracted positions in FIGS. 10a and 10c and is in the extended position in FIG. 10b, where the support system includes the speaker and one or more associated cables, in accordance with an embodiment of the present patent application.
Figure 10B:
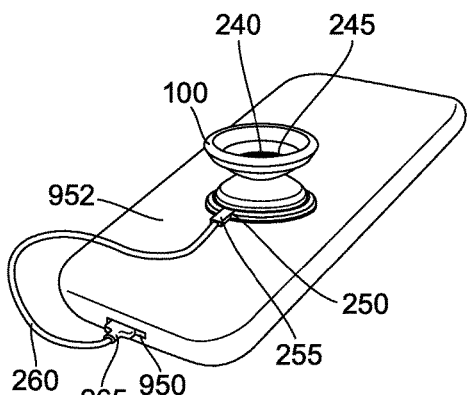
Figure 10C:
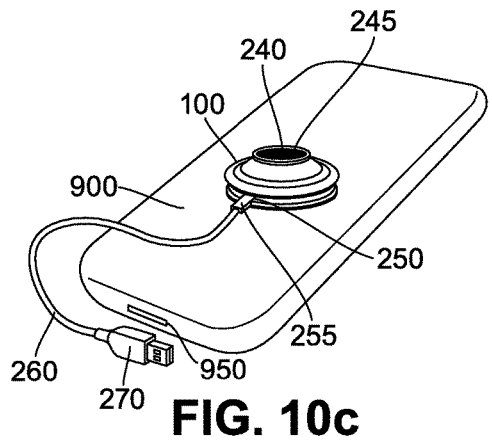

FIGS. 10a-10c show exemplary views the support system 100 (in the closed and open stages of transformation) including the optional amplified speaker 240 and some various cord arrangements for transmission of data/information and power. FIG. 10a shows the support system 100 in the closed cup like position with the amplified speaker 240's protective grill 245 exposed. A connected audio/data cable 260 is attached/links the support system 100 to the electronic device such as the portable electronic device 900 (with or without a protective case 952) by way of a cable connector 255 inserted into a connector receiver 250. On the opposing end of the connected audio/data cable 260, a cable connector 265 is provided. The cable connector 265 is designed to insert into the electronic device 900's multi-function receptor 950. In this configuration, an audio data is directly transmitted through the data cable 260 from the portable electronic device 900 to the speaker 240. In an alternative embodiment, the speaker 240 could be or contain a memory chip so as to facilitate important or excess data stored on the memory chip to be transmitted to and from the portable electronic device 900.

FIG. 10b shows the support system 100 in the configuration as described and shown in FIG. 10a, fully transformed and protruding upwards as to allow two of user's fingers to easily interlace between the invertible member 500 and the support member 300. In this configuration, the cable or additional earbud set can be wound around the support system 100 due to its natural spool shape (not shown).

FIG. 10c illustrates a configuration where one end of the cable 260 has a plug that mates to a power source so a rechargeable battery of the speaker 240 can be recharged when needed (e.g., by way of standard USB power brick plugged into a wall or from a computer with USB power capability). FIG. 10c also illustrates a non-connected wireless configuration in which the speaker 240 can be connected to electronic device 900 by way of wireless means such as Bluetooth, NFC when the speaker 240 is not physically connected to the electronic device 900. The speaker 240 may also be charged in a non-connected wireless configuration.

Figure 11A:
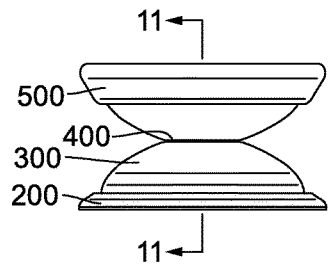
FIG. 11a shows a side view of the support system in the extended position, where the support system comprises an auxiliary power source/rechargeable battery, in accordance with an embodiment of the present patent application.
Figure 11B:
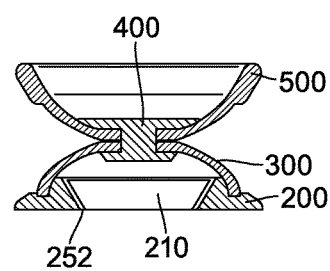
FIG. 11b shows a cross-sectional side view (taken along an axis 11-11 of FIG. 11a) of the support system in the extended position, where the support system comprises the rechargeable battery, in accordance with an embodiment of the present patent application.

FIGS. 11a and 11b show the support system 100 in the transformed extended position. The invertible member 500 is shown in the extended or cup like shape. The invertible member 500 is interconnected to the support member 300 by way of the actuatable connector 400 that is functionally designed to interconnect the two members 300 and 500 by utilizing a snap fit, oversized grommet or other similar arrangement so as to retain the invertible member 500 and the support member 300 securely.

The base 200, in FIG. 11b, has a recessed cavity 252 that is configured to receive a power source such as a rechargeable battery 210. The rechargeable battery 210 may include a controller (not shown). The rechargeable battery 210 can be affixed to or assembled within the recessed cavity 252 of the base 200. The rechargeable battery 210 may also be charged in a non-connected wireless configuration.

Figures 12A, 12B:
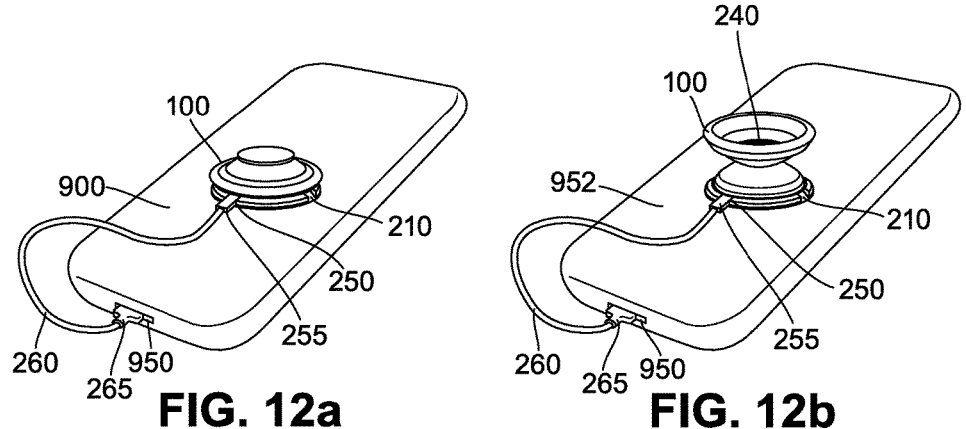
FIGS. 12a-12c show perspective views of the support system mounted on the portable electronic device, the support system is in the retracted positions in FIGS. 12a and 12c and is in the extended position in FIG. 12b, where the support system includes the rechargeable battery and one or more associated cables, in accordance with an embodiment of the present patent application.
Figure 12C:
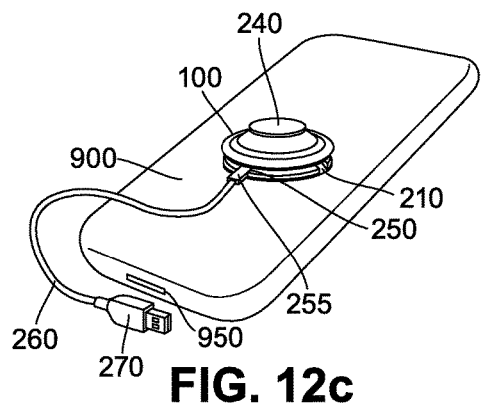

FIGS. 12a-12c show views of the support system 100 (in the closed and open stages of transformation) including the optional auxiliary power source 210 and some various cord arrangements for transmission of power (and/or data) and the ability to recharge the battery of the portable electronic device 900.

FIG. 12a shows the support system in the closed cup like position with the auxiliary power source 210. A connected transmission cable 260 is attached and links the support system 100 to the electronic device such as mobile phone 900 (with or without a protective case 952) by way of a cable connector 255 inserted into a connector receiver 250. On the opposing end of the cable 260, a cable connector 265 is provided. The cable connector 265 is designed to insert into the electronic device's multi-function receptor 950. In this configuration, DC power is regulated through a controller circuit (not shown) and then transmitted through the cable 260 from the auxiliary power source 210 to the electronic device 900.

FIG. 12b shows the support system 100 in the configuration as described and shown in FIG. 12a, fully transformed and protruding upwards as to allow fingers to easily interlace between the invertible member 500 and the support member 300. FIG. 12c illustrates the configuration whereas one end of the cable 260 has a plug that mates to a power source so the rechargeable battery of the auxiliary power source 210 can get recharged when needed (by way of standard USB power brick, AC DC converter plugged into a wall, or from a computer with USB power capability). The rechargeable battery 210 may also be charged in a non-connected wireless configuration.

Figure 13:
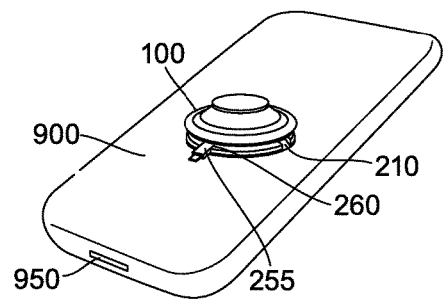
FIG. 13 shows a perspective view of the support system mounted on the portable electronic device and in the retracted position, where the support system includes an auxiliary power source and an associated pullout cable, in accordance with an embodiment of the present patent application.
Figure 14:
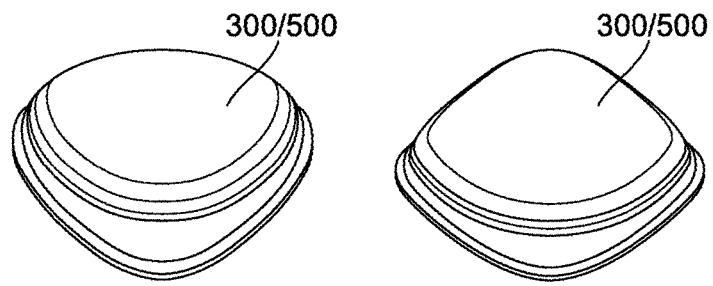
FIG. 14 shows perspective views of the support systems in their retracted positions, where the support systems have different shaped configurations, in accordance with an embodiment of the present patent application.

FIG. 13 shows a view of the support system 100 (in the closed position) including the optional auxiliary power source 210. The auxiliary power source 210 includes a pullout cable with connector configuration. The transmission cable 260 is recessed within the support system 100 while the cable connector 265 protrudes so as to be accessible enough to be grasped and pulled out by the operator's fingers. The connector 265 may be directly pulled out and inserted into the electronic device such as mobile phone 900 (with or without a protective case 952) by way of into the electronic device's multi-function receptor 950. The connector 265 once disconnected from the receptor 950, optionally retracts the cable 260 automatically by way of a spring and clutch mechanism back into the support system 100.

The power source 210 and the speaker 240 may be hardwired or wireless. The speaker 240 may be battery powered or may be powered by the power source of the portable electronic device 900. The power source 210 and the speaker 240 may include a controller therein. The receivers and the transmitters are configured to establish a communication link or communication network between the power source 210, the speaker 240, the controller(s) of the support system 100 with the portable electronic device 900 and/or other devices prior to the transmission of information/data or signals. The communication network may include any communication network such as the telephone network, wide area network, local area network, Internet or wireless communication network. Examples of wireless communications may include Bluetooth, RF, Wi-Fi, infrared, ultrasonic, or any other wireless connection.

The invertible member 500 and the support member 300, in one embodiment, together are formed as a single, one-piece member. In one embodiment, the resiliently deformable invertible member 500 and the resiliently deformable support member 300 are fused together at their central portions 550 and 350.

Figure 16:
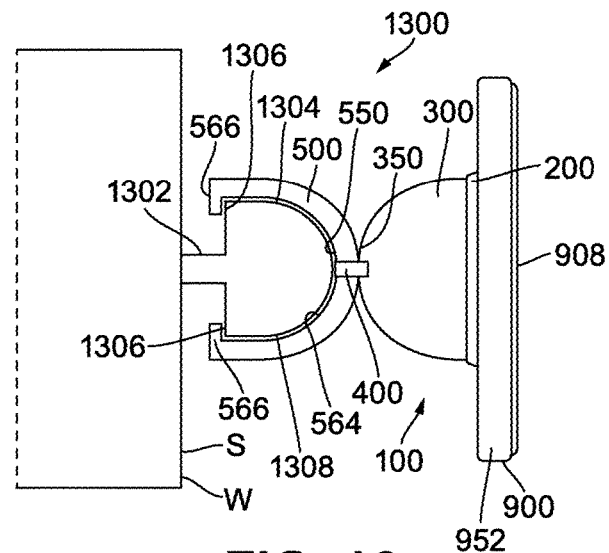
FIG. 16 shows a side view of a mount system in accordance with an embodiment of the present patent application, where the mount system includes a stationary attachment device and the support system.

FIG. 16 shows a side view of a mount system 1300 in accordance with an embodiment of the present patent application.

In one embodiment, the mount system 1300 comprises a stationary attachment device 1302 and the support system 100 for use with the portable electronic device 900. The support system 100 comprises a base, a resiliently deformable support member 300, and a resiliently deformable invertible member 500.

The base 200 is configured to be mounted on the portable electronic device 900 or the case 952 thereof. The support member 300 is provided on the base 200. The support member 300 has a convex configuration projecting outwardly from the base 200. The invertible member 500 is connected to the support member 300. The invertible member 500 is invertible between (a) a retracted position having a convex configuration overlapping the support member 300, and (b) an extended position inverted from the convex, retracted position wherein the invertible member 500 has a convex configuration overlapping the stationary attachment device 1302.

Central portions 350, 550 of the support member 300 and the invertible member 550 together define an actuatable portion. The actuatable portion is operable by depression thereof by the stationary attachment device 1302 when the invertible member 500 is in the retracted position thereof to inwardly deform the central portions 350, 550 of the invertible member 500 and the support member 300 so as to initiate inversion of the invertible member 550 from the retracted position to the extended position in which the invertible member 550 has an overlapping and interengaging relationship with the stationary attachment device 1302 to mount the support system 300 to the stationary attachment device 1302.

The support system 100 of the mount system 1300 further comprises an actuatable connector 400 connecting the central portions 350, 550 of the support member 300 and the invertible member 500 together to define the actuatable portion for operation by depression of the actuatable connector 400.

The stationary attachment device 1302 is stationaryly mounted on a support S or a wall W (vertical or horizontal). The stationary attachment device 1302 is stationaryly mounted on a surface inside a car/vehicle. The stationary attachment device 1302 is stationaryly mounted to vent, dashboard, ceiling, windshield, radio/speaker/lighting housing, steering wheel/column, cup-holder, etc.

The stationary attachment device 1302 may be a portable device stand. The portable device stand 1302 is first mounted on the support S (e.g., car vent) and the invertible member 500, when in its extended position, of the system 100 is configured to pop around a protruding support portion 1308 of the portable device stand 1302.

When the invertible member 500 is in the extended position thereof, an outer surface 1304 of the stationary attachment device 1302 is configured to face and fit within an inner face 564 of the invertible member 500, and radially inwardly extending flange portions 566 of the invertible member 500 engage with portions 1306 of the stationary attachment device 1302 to attach the support system and the stationary attachment device 1302.

A method for mounting the support system 100 for use with the portable electronic device 900 to the stationary attachment device 1302 is provided. The support system 100 comprises the base 200, the resiliently deformable support member 300, and the resiliently deformable invertible member 500. The base 200 is configured to be mounted on the portable electronic device 900 or the case 952 thereof. The resiliently deformable support member 300 is provided on the base 200. The resiliently deformable support member 300 has a convex configuration projecting outwardly from the base 200. The resiliently deformable invertible member 500 is connected to the resiliently deformable support member 300. Central portions 350 and 550 of the support member 300 and the invertible member 550 together to define an actuatable portion thereof.

The method comprises mounting the support system 100 on the portable electronic device 900 or the case 952 thereof, when the resiliently deformable invertible member 500 is in the retracted position having a convex configuration overlapping the resiliently deformable support member 300; and actuating the actuatable portion by depression thereof by the stationary attachment device 1302 when the resiliently deformable invertible member 500 is in the retracted position thereof to inwardly deform the central portions 350 and 550 of the resiliently deformable invertible member 500 and the resiliently deformable support member 300 so as to initiate inversion of the resiliently deformable invertible member 500 from the retracted position to an extended position in which the resiliently deformable invertible member 500 has a convex configuration overlapping the stationary attachment device 1302.

The case 952 is a removable case that is configured to cover portions of the portable electronic device 900. The case 952 is configured to provide added protection to the portable electronic device 900 to prevent surface damage to the housing of the portable electronic device 900, as well as providing impact protection. The case 952 may include a clip or an attachment post for a clip, to allow the user to secure the case 952 and the portable electronic device 900 to an object, such as a belt. The case 952 and the support system 100 may give the user 800 a more secure grip or improved tactile experience when compared to the housing or enclosure of the portable electronic device 900. The case 952 may also provide ornamentation to the portable electronic device 900 and carry indicia, advertising, or graphic material. The case 952 can be made of many different types of material, such as hard or soft plastics, rubber, leather, cloth, metal, and silicone.

The present patent application, thus, provides a resiliently constructed and assembled system or device 100 in which the primary outer layer component/member 500 is invertible from a general dome like shape (i.e., retracted position RP) to a more cup like shape (i.e., extended position RP) allowing for the object (e.g., the portable electronic device 900 or its case/protective encasement 952) in which the device or system 100 is mounted to, so as to be gripped more securely and easily with one/single hand by interlacing the fingers around the now inverted device 100. The cup like shape (i.e., extended position RP) of the invertible member 500 that can be inverted by pressing on the center of the device or system 100, further allows the object to be positioned in such a way as to aid in viewing or operating the object's functions. The device or system 100 then can be resiliently inverted back from the cup like shape (i.e., extended position RP) to the dome like shape (i.e., retracted position RP) by pressing down on the cup like shape's edges so as to reduce its protruding dimension significantly as to not encumber the transportation and or storage of the object (e.g., the portable electronic device 900 or its case/protective encasement 952) it has been attached to.

The present patent application and its various embodiments as described above uniquely address the observed, noted and researched findings and improve on the prior and current state of the art devices or systems. The listed products, features and embodiments as described in the present patent application should not be considered as limiting in any way. The disclosed features and embodiments of the present patent application can be applied to a range of products that are grip and positioning based products.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A system for use with a portable electronic device comprising:
   a support system for use with the portable electronic device, the support system comprising:
      a base configured to be mounted on the portable electronic device or a case thereof;
      a resiliently deformable support member provided on the base, the support member having a convex configuration projecting outwardly from the base; and
      a resiliently deformable invertible member connected to the support member and being invertible between (a) a retracted position having a convex configuration overlapping the support member and (b) an extended position inverted from the convex, retracted position wherein the invertible member has a concave configuration projecting outwardly from the support member;

wherein central portions of the support member and the invertible member together define an actuatable portion, the actuatable portion being operable by depression thereof when the invertible member is in the retracted position thereof to inwardly deform the central portions of the invertible member and the support member, in a direction towards the base, so as to initiate inversion of the invertible member from the retracted position to the extended position.

2. The system of claim 1, further comprising an actuatable connector connecting the central portions of the support member and the invertible member together to define the actuatable portion for operation by depression of the actuatable connector.

3. The system of claim 2, wherein, when the invertible member is in the extended position, one of the invertible member and the support member is configured to be pivotable with respect to the actuatable connector and the other of the invertible member and the support member.

4. The system of claim 2, wherein the base is configured to receive a power source therein, wherein the power source is configured to charge an internal battery of the portable electronic device.

5. The system of claim 4, wherein the power source is a rechargeable battery, wherein the rechargeable battery is powered by an external power source.

6. The system of claim 2, wherein the base is configured to receive a speaker therein, wherein the actuatable connector includes a speaker grill and a sound tube that are configured to transmit sound waves produced by the speaker.

7. The system of claim 6, wherein the speaker is powered by the portable electronic device.

8. The system of claim 1, wherein the invertible member is formed as a single, one-piece member.

9. The system of claim 1, wherein the base is configured to be mounted on a surface of the portable electronic device, or on a surface of the case for use with the portable electronic device, wherein the case configured to surround a back and sides of the portable electronic device.

10. The system of claim 1, wherein the base is integrally formed with the case for use with the portable electronic device, wherein the case configured to surround a back and sides of the portable electronic device.

11. The system of claim 1, wherein the support system is a stand that is configured to be mounted on a mount surface so as to position the portable electronic device in a desired viewing configuration.

12. The system of claim 1, wherein the support system is a holder that is configured to enable a user of the portable electronic device to insert two fingers between surfaces of the invertible member and the support member, when the invertible member is in the extended position, so as to hold the portable electronic device using the support system.

13. The system of claim 1, wherein the base includes a connector receiver that is configured to receive a cable connector of a cable, wherein the cable is selected from the group consisting of a data cable, an information cable, a data and power cable, and a power cable.

14. The system of claim 1, wherein, once the invertible member reaches a deformation threshold, the invertible member inverts instantly into the extended position.

15. A system for use with a portable electronic device comprising:
a support system for use with the portable electronic device, the support system comprising:
a base configured to be mounted on the portable electronic device or a case thereof;
a resiliently deformable support member provided on the base, the support member having a convex configuration projecting outwardly from the base; and
a resiliently deformable invertible member connected to the support member and being invertible between (a) a retracted position having a convex configuration overlapping the support member and (b) an extended position inverted from the convex position wherein the invertible member has a concave configuration projecting outwardly from the support member;
wherein central portions of the support member and the invertible member together define an actuatable portion, the actuatable portion being operable by depression thereof when the invertible member is in the retracted position thereof to inwardly deform the central portions of the invertible member and the support member so as to initiate inversion of the invertible member from the retracted position to the extended position,
wherein, once the invertible member reaches a deformation threshold, the invertible member inverts instantly into the extended position, and
wherein, when the invertible member is in the extended position, distal ends of the invertible member are moved outwardly and downwardly, towards the base, to outwardly deform the central portions of the invertible member and the support member so as to initiate movement of the invertible member from the extended position to the retracted position.

16. The system of claim 15, wherein, once the invertible member reaches the deformation threshold, the invertible member inverts instantly into the retracted position.

17. A mount system comprising:
a stationary attachment device; and
a support system for use with a portable electronic device, the support system comprising:
a base configured to be mounted on the portable electronic device or a case thereof;
a resiliently deformable support member provided on the base, the support member having a convex configuration projecting outwardly from the base; and
a resiliently deformable invertible member connected to the support member, the resiliently deformable invertible member being invertible between (a) a retracted position having a convex configuration overlapping the support member and (b) an extended position inverted from the convex, retracted position wherein the invertible member has a convex configuration overlapping the stationary attachment device;
wherein central portions of the support member and the invertible member together define an actuatable portion, the actuatable portion being operable by depression thereof by the stationary attachment device when the invertible member is in the retracted position thereof to inwardly deform the central portions of the invertible member and the support member, in a direction towards the base, so as to initiate inversion of the invertible member from the retracted position to the extended position in which the invertible member has an overlapping and interengaging relationship with the stationary attachment device to mount the support system to the stationary attachment device.

18. A mount system comprising:
a stationary attachment device; and
a support system for use with a portable electronic device, the support system comprising:
   a base configured to be mounted on the portable electronic device or a case thereof;
   a resiliently deformable support member provided on the base, the support member having a convex configuration projecting outwardly from the base; and
   a resiliently deformable invertible member connected to the support member, the resiliently deformable invertible member being invertible between (a) a retracted position having a convex configuration overlapping the support member and (b) an extended position inverted from the convex, retracted position wherein the invertible member has a convex configuration overlapping the stationary attachment device;
wherein central portions of the support member and the invertible member together define an actuatable portion, the actuatable portion being operable by depression thereof by the stationary attachment device when the invertible member is in the retracted position thereof to inwardly deform the central portions of the invertible member and the support member so as to initiate inversion of the invertible member from the retracted position to the extended position in which the invertible member has an overlapping and interengaging relationship with the stationary attachment device to mount the support system to the stationary attachment device, and
wherein, when the invertible member is in the extended position thereof, an outer surface of the stationary attachment device is configured to face and fit within an inner face of the invertible member, and radially inwardly extending flange portions of the invertible member engage with portions of the stationary attachment device to attach the support system and the stationary attachment device.

19. The mount system of claim 17, further comprising an actuatable connector connecting the central portions of the support member and the invertible member together to define the actuatable portion for operation by depression of the actuatable connector.

20. A method for mounting a support system for use with a portable electronic device to a stationary attachment device, the support system comprising: a base configured to be mounted on the portable electronic device or a case thereof; a resiliently deformable support member provided on the base, the support member having a convex configuration projecting outwardly from the base; and a resiliently deformable invertible member connected to the support member; wherein central portions of the support member and the invertible member together define an actuatable portion thereof, the method comprising:
   mounting the support system on the portable electronic device or the case thereof, when the invertible member is in a retracted position having a convex configuration overlapping the support member; and
   actuating the actuatable portion by depression thereof by the stationary attachment device when the invertible member is in the retracted position thereof to inwardly deform the central portions of the invertible member and the support member so as to initiate inversion of the invertible member from the retracted position to an extended position in which the invertible member has a convex configuration overlapping the stationary attachment device.

21. The method of claim 20, further comprising an actuatable connector connecting the central portions of the support member and the invertible member together to define the actuatable portion for operation by depression of the actuatable connector.

* * * * *